Patented Jan. 30, 1945

2,368,557

UNITED STATES PATENT OFFICE 2,368,557

FULLY ACETYLATED SUGAR ACIDS AND PROCESSES FOR THEIR PRODUCTION

Randolph T. Major, Plainfield, N. J., and Elmer W. Cook, New York, N. Y., assignors to Merck & Co., Inc., Rahway, N. J., a corporation of New Jersey No Drawing. Original application December 23, 1936, Serial No. 117,336. Divided and this application March 8, 1939, Serial No. 260,586

6 Claims. (Cl. 260—483)

This is a division of application Serial No. 117,336, filed December 23, 1936.

This invention relates to fully acetylated sugar acids and to processes for their production.

The 2-keto-sugar acids have recently acquired considerable interest in view of the fact that the enol forms of the lactones from these acids have been shown to be vitamin C and its homologs. (Hirst, Chemistry and Industry, 1933, p. 221, and Haworth, Chemistry and Industry, 1933, 482.)

We have discovered a new method of preparing the acetyl derivatives of 2-keto sugar acids which involves the use of fully acetylated acids as starting materials.

According to our improved process, the selected fully acetylated sugar acid is first converted to its acyl chloride, which is converted to the corresponding nitrile, and from this nitrile the corresponding 2-keto acid is obtained by hydrolysis.

In the following examples we are illustrating the steps of our process as applied specifically to pentaacetyl-d-gluconic acid and tetraaceytl-d,1-xylonic acid:

FULLY ACETYLATED SUGAR ACID ACYL CHLORIDES

The dry fully acetylated sugar acid is added with cooling to a suspension of one molecular equivalent of phosphorous pentachloride in ten times its weight of dry ether. The reaction is soon completed, as shown by the disappearance of the phosphorous pentachloride.

Pentaacetyl-d-gluconyl chloride

After the solution has stood at room temperature for 2 or 3 hours, the ether is evaporated in vacuo. Dry xylene is then added. This and the phosphorous oxychloride formed in the reaction are removed by evaporation at 45 to 50° C., in vacuo. The addition of xylene, followed by evaporation in vacuo, is repeated twice. The residual gum is dissolved in dry ether. Upon evaporation in a slight vacuum, beautiful white crystals separate. They have a melting point of 68–70°, and $(\alpha)_D^{20}+2°$ (dry chloroform, c,2).

With water, the acid chloride gives pentaacetyl-d-gluconic acid monohydrate.

Tetraacetyl-d,l-xylonyl chloride

White crystals appear soon after solution of the phosphorous pentachloride. The precipitate is recrystallized from dry ether. The product has a melting point of 90–92°, and $(\alpha)_D^{20}$ 0° (dry chloroform; c,2).

FULLY ACETYLATED 2-KETO SUGAR ACID NITRILES

Pentaacetyl-2-keto-d-glucoheptonitrile

About 10 gms. of pentaacetylgluconyl chloride are heated for one hour with 4.7 gms. of silver cyanide in a closed tube at 120–125° C. The fused contents are frequently shaken to insure good contact of the acid chloride with the silver cyanide. After cooling, the gummy material is thoroughly extracted with anhydrous ether and filtered from the silver salts. Petroleum ether is added carefully to precipitate a part of the product as a dark colored syrup, thereby removing most of the color. Then an excess of petroleum ether is added with cooling. A gum is precipitated along with some crystalline product. The supernatant liquor is poured off and on evaporation yields crystalline pentaacetyl-2-keto-d-glucoheptonitrile. The gum is dissolved in a small quantity of absolute alcohol and upon standing in an ice box for 24 hours yields a quantity of pentaacetyl-2-keto-glucoheptonitrile. The product is purified by recrystallizing it from absolute alcohol. It has a melting point of 116°, and $(\alpha)_D^{20}=+7°$ (dry chloroform, c,2).

When this compound is heated in water with either dilute acid or a base, hydrogen cyanide is evolved.

Tetraacetyl-2-keto-d,l-gulononitrile

This nitrile is prepared in the same way as pentaacetyl-2-keto-d-glucoheptonitrile, except that the filtrate obtained after the addition of sufficient petroleum ether to the ether extract to produce slight turbidity, is treated with another larger portion of petroleum either which precipitates a gum. Trituration of this gum with absolute alcohol yields a solid precipitate. It is recrystallized from alcohol, and has a melting point of 125–126°.

FULLY ACETYLATED 2-KETO SUGAR ACIDS

Pentaacetyl-2-keto-d-glucoheptonic acid

About 7.55 gms. of pentaacetyl-2-keto-d-glucoheptonitrile are dissolved in 20 cc. of pure dioxane. To this, about 13.1 cc. of 1.39 n hydrogen chloride in dioxane is added. The solution is cooled and 0.33 cc. of water is added. The solution is allowed to stand for another 24 hours, by which time ammonium chloride precipitates. Ether is added and the ammonium chloride filtered. The filtrate is evaporated in vacuo to a gum. The gum is dissolved in ether and evaporation in vacuo is repeated. The remaining gum crystallizes on scratching. It has a melting point of 136-138°. After recrystallization from water it melts at 160-161°, $(\alpha)_D^{20}$ 0° (alcohol, c,2). A solution of the keto acid in water is acid to congo red paper. It is extremely soluble in alcohol, ether, chloroform, and acetone.

ESTERS OF FULLY ACETYLATED 2-KETO SUGAR ACIDS

*Ethyl pentaacetyl-2-keto-d-glucoheptonate*

A solution of 1 gm. of pentaacetyl-2-keto-d-glucoheptonic acid in 10 cc. of absolute alcohol containing 2% hydrogen chloride is warmed at 55°-60° for five minutes. The solution is quickly cooled to nearly room temperature and then allowed to crystallize. It has a melting point of 97-98°, $(\alpha)_D^{20} = 0°$ (alcohol; c,2).

*Methyl tetraacetyl-2-keto-d-gluconate*

About 1 gram of methyl-2-keto-d-gluconate is added to 5 cc. of acetic anhydride containing 0.4 gm. of zinc chloride at 0°. As soon as solution is complete (about 30 minutes) the mixture is allowed to come to room temperature and remain there for 24 hours. It is then poured into 25 cc. of ice water. A white solid separates. It is recrystallized from absolute alcohol and has a melting point of 168-169° and $(\alpha)_D^{20} = -133°$, (chloroform; c,2).

From the foregoing description of the detailed steps of our new process, it will be apparent to those skilled in the art that tetraacetyl-2-keto-gulononitrile can be similarly hydrolyzed to the corresponding tetraacetyl-2-keto-gulonic acid and that this may be subsequently esterified, all in accordance with the steps described for the production of the corresponding 2-keto-glucoheptonic acid and its derivatives.

We claim as our invention:

1. Fully acetylated 2-keto-sugar acids.
2. Pentaacetyl-2-keto-d-glucoheptonic acid.
3. Tetraacetyl-2-keto-gulonic acid.
4. Process for the production of acetylated 2-keto-sugar acids from fully acetylated sugar acids which comprises preparing the acyl chloride of the fully acetylated sugar acids, converting the acyl chlorides into the corresponding nitriles, and hydrolyzing the latter to give the corresponding 2-keto-sugar acids.
5. Process for the production of pentaacetyl-2-keto-glucoheptonic acid which comprises treating anhydrous pentaacetyl gluconic acid with phosphorous pentachloride, reacting upon the chloride thus obtained with silver cyanide, and converting the resulting pentaacetyl-2-keto-d-gluco-heptonitrile to pentaacetyl-2-keto-d-glucoheptonic acid, by hydrolysis.
6. Process for the production of tetraacetyl-2-keto-gulonic acid which comprises treating tetraacetyl-d-l-xylonic acid with phosphorous pentachloride, reacting upon the acylchloride thus obtained with silver cyanide, and converting the resulting tetraacetyl-2-keto-d-l-gulononitrile to tetraacetyl-2-keto-gulonic acid by hydrolysis.

RANDOLPH T. MAJOR.
ELMER W. COOK.